United States Patent [19]

Kister

[11] 3,892,816

[45] July 1, 1075

[54] PROCESS FOR OXYCHLORINATION OF ETHYLENE

[75] Inventor: Albert T. Kister, Houston, Tex.

[73] Assignee: Shell Oil Company, Houston, Tex.

[22] Filed: Dec. 19, 1972

[21] Appl. No.: 316,609

[52] U.S. Cl. .......................... 260/659 A; 260/659 A
[51] Int. Cl. ............................................. C07c 17/02
[58] Field of Search........ 260/659 A, 662 A, 658 R, 260/656 R

[56] References Cited

UNITED STATES PATENTS

| | | | |
|---|---|---|---|
| 3,042,728 | 7/1962 | Hirsh et al. | 260/659 A |
| 3,184,515 | 5/1965 | Penner et al. | 260/659 A |
| 3,363,010 | 1/1968 | Schwarzenbek | 260/659 A |
| 3,475,505 | 10/1969 | Hornig et al. | 260/659 A |
| 3,699,178 | 10/1972 | Suzuki et al. | 260/659 A |

FOREIGN PATENTS OR APPLICATIONS

| | | | |
|---|---|---|---|
| 32,406 | 10/1970 | Japan | 260/659 A |

*Primary Examiner*—Delbert E. Gantz
*Assistant Examiner*—Joseph A. Boska

[57] ABSTRACT

Ethylene is selectively oxychlorinated to ethylene dichloride by the process of contacting ethylene, hydrogen chloride and molecular oxygen in the vapor phase at a temperature of from about 450°F to about 670°F in the presence of a fixed-bed, supported cupric chloride catalyst. Ethylene is introduced into the inlet portion of the reaction zone in a sufficient stoichiometric excess and hydrogen chloride and molecular oxygen are added to the reaction zone in a sufficient plurality of points throughout the reaction zone to maintain the hydrogen chloride: ethylene molar ratio below about 0.7 and the oxygen: ethylene molar ratio below about 0.12 in the reaction mass during passage through the reaction zone.

7 Claims, No Drawings

PROCESS FOR OXYCHLORINATION OF ETHYLENE

BACKGROUND OF THE INVENTION

This invention relates to the preparation of ethylene dichloride by catalyzed oxychlorination of ethylene. More particularly, this invention is directed to a novel process for production of ethylene dichloride in high selectivity by vapor-phase oxychlorination of ethylene in the presence of a fixed-bed, supported cupric chloride catalyst.

Processes employing fixed bed cupric chloride oxychlorination catalysts for the conversion of ethylene to ehtylene dichloride are utilized on a broad scale commercially, usually in integrated processes for preparation of vinyl chloride monomer (VCM). The proclivity of "hotspot" formation —i.e., narrow zones in the fixed bed wherein the temperature of the bed is significantly, sometimes critically, higher than the remainder of the bed — due to the highly exothermic nature of the oxychlorination reaction is a continuing problem of considerable magnitude in these processes. Hotspots are particularly troublesome in those processes wherein the oxychlorination reaction zone is maintained within the temperature range (about 670°F being considered a practical maximum) wherein ethylene is converted to ethylene dichloride in high selectivity with minimal simultaneous pyrolysis to VCM or production of combustion (oxidation) by-products. The formation of these hotspot zones in fixed-bed oxychlorination systems is undesirable, in part, because it results in inefficient utilization of catalyst over the whole of the catalyst bed and inefficient utilization of heat exchange surface and reactant coolant capacity with the concomitant potential for runaway reaction. The occurance of these hotspots, additionally, places constraints on the production capacity of the system, both in terms of reactant throughput rate and catalyst concentration in the fixed bed. Especially designed reaction vessels are required along with elaborate reaction monitoring devices and catalyst loading procedures to insure control of the hotspot temperatures in the fixed bed.

Thus, it is evident that in fixed bed, conventional oxychlorination reaction systems for the conversion of ethylene to ethylene dichloride in high selectivity, the problem of controlling the hotspot temperatures in the catalyst bed is important to the optimization of the system.

DESCRIPTION OF THE PRIOR ART

A number of methods of reducing the hotspot temperatures occurring in conventional, fixed bed "Deacon" type oxychlorination catalysts, such as copper chloride, have been employed to afford ethylene dichloride in high yield. Most of the prior art oxychlorination processes known and particularly those fixed bed processes affording conversions of ethylene to ethylene dichloride in high selectivity employ reactant ratios which deviate only slightly from stoichiometric ratios, although minor excesses and deficiencies of one or more of the reactants are known.

Thus, in high capacity oxychlorination systems employing fixed bed copper chloride catalyst systems wherein the reactants are introduced at superatmospheric pressures, e.g., up to 150 psig, a number of methods are known to control the reaction zone temperature and minimize the hotspot temperature. Externally cooled tubular reactors of critical diameter size — i.e., substantially smaller than 2 inches — are used in combination with catalyst loading of the fixed bed in a plurality of zones of increasing catalyst concentration, so that the zone nearest the reactant feed inlet contains no more than 50 volume percent active catalyst particles (catalyst particles containing 1–20 percent active ingredient). In this process the reactants are fed at nearly stoichiometric ratios in intimate admixture to reaction zone (U.S. Pat. No. 3,184,515). Multiple reactors of varying tube diameter are used with the initial reactor having the smallest diameter, i.e., 0.5–1 inches and subsequent reactors gradually increasing in diameter, each containing a fixed bed of a supported copper chloride catalyst in an amount as low as 1 percent by weight of the catalyst at the upstream (reactant inlet) end of the catalyst bed but increasing to 35 percent by weight of the catalyst. In this modification, the reactants are fed to the reaction zone approximately stoichiometric ratios but with the ethylene and hydrogen chloride being fed only to the inlet end of the first reaction and the oxygen containing gas being split between each reactor so only a portion of the ethylene is chlorinated in each reactor (British Pat. No. 1,104,666). This British Patent also indicates that the ethylene and hydrogen chloride gas can likewise be added to the reactors as dictated by the stoichiometry of the reaction involved, but that it is more desirable for purposes of temperature control (minimizing of hotspots) to add the entire reaction requirement of ethylene and hydrogen chloride to the first reactor.

While both of the aforementioned patents speak of the oxygen source for the oxychlorination reaction as interchangeably being oxygen or air, the British Patent recognizes the beneficial effect on the hotspot temperature of utilization of air as the oxygen source because of the diluent effect of the inert gases present in the air. Other such gaseous inerts which have been suggested as oxychlorination diluents include nitrogen, argon, helium, water, carbon dioxide, paraffins and similar materials. However, the use of inert gaseous diluents raises potential atmospheric pollution problems of a substantial nature, since the cost of recycling such diluents, at least for those preferred low value diluents would be prohibitive, and they are typically vented.

Other prior art processes disclose the catalytic oxychlorination of ethylene utilizing other than stoichiometric feed ratios of ethylene:hydrogen chloride:oxygen, e.g., Japanese patent application No. 70-32406 and U.S. Pat. Nos. 3,291,846 and 3,475,505. These disclosures are directed to processes utilizing fluidized beds or to specific catalytic species of a different elemental nature than the conventional cupric chloride catalyst for which control of reaction zone temperature is known to be a problem.

From consideration of the methods employed in the pertinent prior art processes above to control the hotspot temperature in fixed bed oxychlorination processes employing cupric chloride catalysts, it can be seen that the techniques disclosed are less than optimum.

Thus, it would be highly desirable if a oxychlorination process utilizing fixed bed conventional Deacon type catalysts was available which would afford high selectivities of ethylene dichloride in high capacity operation wherein the hotspot temperatures in the fixed bed are significantly below those obtainable with prior art processes. The problems of the prior art processes due substantially to hotspot temperature control would thereby be avoided or minimized.

SUMMARY OF THE INVENTION

It has now been found that ethylene dichloride is obtained in high selectivity by oxychlorination of ethylene with conventional fixed bed supported Deacon type cupric chloride catalysts in a process which comprises contacting ethylene, hydrogen chloride and molecular oxygen in the vapor phase in a reaction zone at a temperature of from about 450°F to about 670°F in the presence of a fixed-bed, supported cupric chloride catalyst. Ethylene is introduced to the inlet portion of the reaction zone in a sufficient stoichiometric excess and hydrogen chloride and molecular oxygen are added to the reaction zone at a sufficient plurality of points throughout the reaction zone to maintain the hydrogen chloride:ethylene molar ratio below about 0.7 and the oxygen:ethylene molar ratio below about 0.12 in the reaction mass during passage through the reaction zone. The resulting ethylene dichloride containing reaction zone effluent is separated into at least one ethylene dichloride containing liquid phase and an organic vapor phase of at least 55%v ethylene. At comparative reactant throughput rates, the oxychlorination reactions performed with conventional Deacon type fixed bed oxychlorination catalysts according to the process of the invention result in hotspot temperatures which are significantly lower and easier to control than those of the fixed bed prior art processes operating within the reaction zone temperature limits wherein ethylene dichloride is obtained in high selectivity.

The significant reduction in hotspot temperature and superior conversions to ethylene dichloride obtained with the instant invention are based on the finding that ethylene, if maintained in the the reaction zone environment at a sufficient stoichiometric excess, functions as an extremely effective heat sink (reaction diluent and heat transfer agent) in this fixed bed catalyst system even though ethylene is a reacting entity in the system. In fact, ethylene when maintained in the reaction zone in the excesses of stoichiometric specified by the invention, is such an effective heat sink that molecular oxygen can be utilized exclusively as the oxygen source, without the addition of inert diluents, and the reactant hydrogen chloride can be added to the reaction zone in stages. It has also been found that, contrary to the teaching of the prior art, molecular oxygen and air are not interchangeable or equivalent as an oxygen source in the fixed bed processes of the prior art within approximately stoichiometric ratios of reactants are used. Substitution of molecular oxygen on a volume bases for air when reactant ratios approaching stoichiometric are used results in a reaction which is so exothermic that the hotspot temperature exceeds the practical range for high selectivity oxychlorination and is not controllable by conventional heat transfer techniques. In other words, the reaction approaches runaway conditions. However, in the process of the instant invention, the use of molecular oxygen is an integral part of the invention. Yet, the instant process affords hotspot temperatures significantly below those obtained with conventional processes wherein stoichiometric feed ratios of reactants are utilized and the oxygen source is diluted with inerts (air).

Moreover, staged addition of reactant hydrogen chloride also forms an integral part of the invention. As indicated in the prior art discussion above, difficulty in controlling the hotspot temperature in the fixed bed makes staging of hydrogen chloride into the fixed bed reaction zones of the prior art processes highly undesirable. However, with the process of the instant invention hydrogen chloride is staged into the reaction zone without creating hotspots in the fixed bed which even approach the excessive temperature range. The process of the instant invention employs staged hydrogen chloride introduction into the reaction zone but gives significantly lower hotspot temperatures at comparative throughputs than the prior art process wherein all the hydrogen chloride is introduced into the inlet end of the reaction zone.

The process of the invention also includes within its scope, the aspect of recycle of the non-product containing reaction zone effluent, i.e., the organic vapor phase of at least 55%v ethylene, to the reaction zone. Application of this aspect of the invention lessens the air pollution problems which plague the prior art processes. Conventional processes, which utilize inert diluents in the reaction stream produce a substantial reaction zone effluent of inert gases and reaction by-products which have been vented to the atmosphere to avoid cost of recovering and recycling the inert gas phase. With the process of the instant invention, recycle of the non-product reaction zone effluent is economically desirable and almost total recycle is possible. With the process of this invention, little, if any, inert material is introduced with the reactant stream into the process. The only buildup of inert materials which would require venting to the atmosphere would originate from by-product formation in the oxychlorination reaction, so that the final inert vent rate from the instant process may be as little as one percent of that for conventional oxychlorination processes. The application of the process of the invention which includes recycling of the non-product reaction zone effluent to the reaction zone forms a preferred aspect of this invention.

DESCRIPTION OF THE PREFERRED EMBODIMENTS

The process of the invention contemplates the conversion of ethylene to ethylene dichloride by contacting the ethylene, hydrogen chloride and molecular oxygen in the vapor phase in the presence of a cupric chloride-containing, supported fixed bed oxychlorination catalyst. Each of the reactants which is introduced into the reaction zone according to the process of the invention will generally be of relatively high purity. Reactant feedstocks of purity suitable for use in the process of the invention are derived from a variety of conventional sources. The hydrogen chloride is suitably derived from any conventional industrial source which provides hydrogen chloride either as the primary product or as a by-product in substantially pure, anhydrous form. Since the preparation of ethylene dichloride by oxychlorination of ethylene is many times utilized in combination with the pyrolysis of ethylene dichloride to vinyl chloride monomer in an integrated process for the production of VCM, a very convenient source of hydrogen chloride is the pyrolysis of ethylene dichloride. In any event, the hydrogen chloride feedstock will generally have a purity of greater than about 98.8% by volume (v). Similarly, the source of the oxygen feed is any conventional industrial source which provides relatively pure molecular oxygen containing little or no inert materials such as nitrogen, argon, oxides of carbon and the like. Such oxygen is conventionally prepared in a variety of cryogenic and electrolytic processes, and may be obtained at a purity in excess of about 95%v.

The reactant ethylene which is charged to the oxychlorination process of this invention may suitably be derived from conventional sources such as cracking of naphtha, gas oils, ethane, and the like, followed by suitable purification steps. Such ethylene suitably has a purity of greater than about 98.8%v. In a preferred embodiment of the process of this invention, the recycle of the non-product reaction zone effluent provides ethylene to the reaction zone. The reaction zone effluent, after the employment of conventional means to separate the reaction products (ethylene dichloride and water), is substantially unreacted ethylene and contains only minor amounts of reaction zone by-products such as ethyl chloride, and oxides of carbon, said by-products being present in a combined amount of not more than 30%v. In addition, ethylene dichloride is present in an amount not greater than about 5%v. In the practice of this preferred embodiment of the invention, fresh or make-up ethylene is introduced into the non-product reaction zone effluent to maintain the reactant mole ratios in the reaction zone which are essential to the practice of this invention. Taking into account the ethylene contributions from both the recycled non-product containing reaction zone effluent and the fresh (make-up) ethylene, the purity of the ethylene feedstock charged to the reaction zone in the practice of this preferred aspect is suitably greater than about 70%v and preferably in the range of from about 78 to about 90%v. On the same basis, the major impurities contributed by the non-product containing reaction zone effluent to the total ethylene feedstock as utilized in this preferred aspect are typically ethyl chloride present from about 0.5 to about 2.0%v, and oxides of carbon (carbon monoxide and carbon dioxide) present from about 3 to about 20%v of the total feedstock. The remainder of the feedstock is typically ethylene dichloride which is carried over in the non-product reaction zone effluent. These impurities can be readily controlled within the ranges described by removing a portion of the non-product containing reaction zone effluent before mixing with fresh feed and prior to its introduction into the reaxtion zone. The magnitude of the stream finally vented is directly related to the inert concentrations contained in the make-up feed streams.

The Catalyst

The catalyst employed in the oxychlorination process of this invention comprises any one of the well known oxychlorination or Deacon type reaction catalysts containing cupric chloride as the active catalytic agent on a suitable carrier or support. Conventionally, the active catalytic agent is deposited on the support in its active form, i.e., as cupric chloride, or optionally, the copper source is deposited in a form which is convertible to the active catalytic species at oxychlorination reaction conditions, e.g., mixtures of cupric chloride and cuprous chloride, cuprous chloride alone or even copper metal. The catalyst composition includes one or more alkali metals and their salts, alkaline earth metals and their salts and/or rare earth metals and their salts which are well known as modifiers and stabilizers for oxychlorination catalysts of this type. Preferred of these oxychlorination catalyst modifiers and stabilizers are the alkali metal chlorides, particularly potassium chloride and the rare earth metal chlorides, particularly cerium and didymium chloride. Didymium is a mixture comprising mainly lanthanum and neodymium, together with smaller quantities of proseodymium and samarium.

The carriers or supports for the catalyst material in the process of the invention are those inert materials conventionally employed in fixed bed oxychlorination processes wherein cupric chloride is the active catalytic species. Suitable carrier or supports include silica, alumina, Fullers earth, pumice, diatomaceous earth and the like. Particularly suitable because of their desirable effect on catalyst activity are high surface area materials such as gamma-alumina, silica-alumina, and high surface area silica. The carrier-supported compositions generally have a copper chloride content in the range of from 1 to 20% by weight calculated as metal to the total quantity of metal plus carrier. In cases where the catalyst composition is modified or stabilized with one or more of the above-described modifiers and/or stabilizers, the total quantity of modifier and/or stabilizer added to the composition generally ranges between 0.1 to 30.0% by weight of the copper present in the composition.

The supported catalyst composition is preferably shaped as particles, chunks, pieces, pellets, rings, spheres and the like, of a size suitable for employment in fixed bed applications. Commonly, the supported catalyst particles are of a size to pass a 4-mesh screen and to rest on a 10 mesh screen (U.S. Sieve Series) though other sizes may be used.

In the practice of the process of the invention, the supported catalyst composition is deployed within the reaction zone in any conventional manner. The fixed bed catalyst mass in the reaction zone may comprise catalyst particles alone or catalyst particles in intimate admixture with an inert solid diluent such as alumina, silica, silicon carbide, graphite and the like. When the catalyst particles are utilized in intimate admixture with an inert solid diluent, the diluent of size similar to the supported catalyst is suitably present at about 5 to about 95 volume percent of the total fixed bed volume. Some reduction in the hotspot temperature in the reaction zone is obtained by maintaining a lower concentration of catalyst in those portions of the reaction zone where the reactant concentration is the highest. Thus, a preferred modification of the process of the invention involves utilization of a fixed catalyst bed wherein the catalyst concentration is incrementally increased from the reactant inlet end of the reaction zone — i.e., that portion of the reaction zone where a substantial portion of the ethylene reactant is introduced — to the reaction product effluent end of the reaction zone. The catalyst concentrations are lowered in those portions of the reaction zone wherein substantial portions of the hydrogen chloride and molecular oxygen reactants are present and the temperature is high. The variation of the catalyst concentration according to this preferred embodiment is facilitated by loading the reaction zone in layers of differing catalyst concentration, either by increasing the solid diluent concentration or by decreasing the concentration of active catalyst deposited on the support. In cases where a solid diluent is employed, the catalyst concentration suitably ranges from about 20 to about 70% by volume in zones where the reactant concentration is the highest, up to more than about 90% by volume in zone where it is the lowest. In cases where the concentration of active catalyst on the support varies, the catalyst concentration suitably ranges from 1–10% by weight in zones where the reactant concentration is the highest to 15–20% by weight in zones where it is the lowest.

The Process

In basic terms, the process of the invention involves introducing into a reaction zone containing a fixed bed of supported, cupric chloride-containing oxychlorination catalyst, reactant ethylene, hydrogen chloride and molecular oxygen in a manner such that the hydrogen chloride and oxygen are added to the reaction mass at a plurality (more than one) of points along the reaction zone, and a specified molar excess of ethylene with respect to the other reactants in the reaction mass in maintained throughout the reaction zone. A reaction zone temperature is utilized such that the reactant ethylene is converted in high yield to ethylene dichloride.

The oxychlorination reaction according to the process of the invention is effected by any conventional technique by which the hydrogen chloride and oxygen reactants can be added to the reaction mass at more than one point along the reaction zone to maintain the molar ratios of hydrogen chloride to ethylene and molecular oxygen to ethylene below about 0.7 and 0.12 respectively, in the reaction mass during passage through the reaction zone. Suitable techniques include employment of a single tubular reactor jacketed with heat exchange equipment and loaded with the fixed bed catalyst. All or substantially all of the reactant ethylene is introduced at the inlet end of the reactor and the reactant hydrogen chloride and molecular oxygen (and the remainder of the ethylene in cases where substantially all of the ethylene is added at the inlet) are introduced at a plurality of points throughout the reaction zone to maintain the above-described reactant molar ratios in the reaction mass during passage through the reaction zone. This technique is also applicable to a plurality of tubular reactors employed in parallel, jacketed and loaded in a manner similar to that described above. In a preferred embodiment of this invention the reaction zone is divided into two or more serially arranged sections, of similar size, e.g., single tubular reactors or a plurality of tubular reactors in parallel — and in an especially preferred configuration, three such sections are utilized. In this preferred embodiment all or substantially all of the reactant ethylene is introduced into the reaction zone at the inlet end of the first section and the reactant hydrogen chloride and molecular oxygen are added at the inlet ends of the first reaction section and one or more of the remaining sections in a manner such that the molar ratio of hydrogen chloride to ethylene and molecular oxygen to ethylene are maintained within the above limits. When the process of the invention is carried out in three serially arranged reaction sections according to this preferred embodiment, the total reaction requirement of hydrogen chloride is suitably split between the three reaction zones such that about 30–60% of the total hydrogen chloride is added to each of the first and second sections and no more than about 30% is added to the last section. The total reaction requirement of molecular oxygen is suitably split between the reaction sections such that about 30–45% of the total molecular oxygen is added to each of the first and second sections and about 10 to about 40% is added to the last section. Preferably, the total hydrogen chloride and total molecular oxygen reaction requirements in this preferred embodiment are split between the three reaction sections as follows: hydrogen chloride — about 50%/50%/0 and molecular oxygen — about 40%/40%/20%.

As indicated above, the substantial advantages of the process of this invention are obtained only if the hydrogen chloride to ethylene and molecular oxygen to ethylene molar ratios present in the reaction mass in the reaction zone are maintained below critical maximums, i.e., 0.7 and 0.12, respectively. While there does not appear to be any corresponding critical minimum molar ratios of these reactants in the reaction mass, i.e., the advantages of the invention are substantially obtained at any reactant molar ratios below the afore-defined critical maximums, practical considerations such as reaction rate, product output rate and reaction zone size and capacity deem that the molar ratios of hydrogen chloride to ethylene and molecular oxygen to ethylene in the reaction mass should be at least 0.15 and 0.02, respectively, at some point in the reaction zone for practical operation of the process of the invention.

The process of the invention contemplates oxychlorination of ethylene to ethylene dichloride in high selectivity. Thus, it is essential to the operation of the process that the reaction zone temperatures be maintained within the temperature range where ethylene is catalytically oxychlorinated to ethylene dichloride in high selectivity with minimal concomitant production of thermal oxidative and/or poly-chlorinated by-products. Suitably, the oxychlorination process of the present invention proceeds at a reaction zone temperature ranging from about 450°F to about 670°F. For optimum catalyst lifetimes and ease of process operation, it is preferred that the reaction zone be maintained in the temperature range of from about 450°F to about 600°F during process operation. Reaction zone temperatures within the afore-described limits are readily maintained by techniques which are well known to those skilled in the art. For example, in cases where the reaction zone comprises a tubular reactor or plurality of tubular reactors, a coolant such as Dowtherm, kerosene, water, and the like is circulated or boiled in external contact with the tubes containing the process flow.

The operating pressure employed with the process of the invention is comparable to that employed in the conventional oxychlorination processes which utilize fixed bed cupric chloride oxychlorination catalysts. While the maximum pressure employed is dependent on factors such as the rate of reactant throughput, pressure rating of equipment, space opening for reactant flow, catalyst and/or diluent particle size and the like, in most applications suitable reaction zone pressures range from about 30 to about 150 psig, preferably within a range from about 50 psig to about 100 psig. For high capacity operation, it is preferable that the reaction zone pressure employed be at least 50 psig with about 150 psig being a practical upper limit for most equipment pressure ratings.

In oxychlorination reactions conducted according to the process of the instant invention the reaction zone effluent is made up of three major component, i.e. ethylene, ethylene dichloride and water, and one or more minor components illustrated by chloroform, carbon tetrachloride, ethyl chloride, trichloroethane, dichloroethanes, oxides of carbon and hydrogen chloride. Trace amounts of oxygen, nitrogen and vinyl chloride monomer are also present. To recover the desired ethylene dichloride reaction zone product, and optionally, the ethylene rich phase of the reaction zone effluent, the reaction zone effluent is separated into at least one ethylene dichloride liquid phase and an organic vapor phase of at least 55%v ethylene. This separation can be accomplished by a variety of techniques. In a preferred method, the oxychlorination zone effluent is cooled to a temperature lower than about 110°F at a pressure of from about 30 to about 80 psig to form an ethylene-rich gas phase and a condensate substantially comprising ethylene dichloride and water. The condensate is worked up by known techniques, e.g., by phase separation to remove a substantial portion of the water followed by distillation of the ethylene dichloride in one or more columns. With this technique the reaction zone by-products and impurities having vapor pressures in the ethylene range, e.g., oxides of carbon and ethyl chloride, will remain with the ethylene-rich vapor phase whereas the less volatile impurities and by-products will remain in the ethylene dichloride liquid phase to be subsequently rejected on further purification of the ethylene dichloride product, e.g., by distillation.

As discussed previously, a preferred aspect of the process of the invention includes recycle of the non-product reaction zone effluent (after separation of the ethylene dichloride and water reaction products) to the reaction zone. Recycle of the non-product reaction zone effluent (substantially unconverted ethylene) according to this preferred embodiment is advantageous because it substantially minimizes air pollution problems associated with ethylene dichloride production by conventional catalytic oxychlorination processes and also because it optimizes the yield of ethylene dichloride from ethylene for the reasons discussed previously. Recovery of the non-product reaction zone effluent and its recycle back into the reaction zone according to this preferred embodiment can be accomplished in any conventional manner. For example, when the ethylene dichloride and water products of the process are recovered by condensation out of the reaction zone effluent stream, the non-condensable (vapor) portion of the reaction zone effluent which contains at least 55%v unreacted ethylene is recycled directly into the reaction zone after adjustment of the temperature and pressure of the recycle stream to that desired for proper reaction zone operations. Addition of fresh or make up ethylene into the reaction zone is used to maintain the reactant molar ratios within those ratios which are critical to the process of the invention. This make-up ethylene is introduced into the reaction zone in admixture with the recycle stream or may be added as a separate stream into the reaction zone.

In the practice of the process of the invention utilizing the preferred aspect of recycle of the non-product reaction zone effluent into the reaction zone, total recycle of the non-product reaction zone effluent is not possible since certain reaction zone by-products, e.g., oxides of carbon, which are produced in small quantities, when carried over with the non-product reaction zone effluent build up to undesirable levels during continued operation of the process. These impurities are readily controlled within acceptable levels by removing a small portion of the recycle stream from the process flow prior to its introduction into the reaction zone. Thus, unless special separation techniques are employed to remove the impurities from the recycle stream, it is preferable to remove a sufficient portion of the recycle stream from the process flow such that the oxides of carbon content, i.e., carbon monoxide and carbon dioxide, of the recycle stream introduced into the reaction zone is maintained below about 30%v of the total recycle stream. With the process of the invention as much as 97% of the non-product reaction zone effluent may be recycled to the reaction zone without exceeding the impurity level specified.

ILLUSTRATIVE EMBODIMENTS I-XXIV

To illustrate the invention a series of comparative ethylene oxychlorination reactions were carried out utilizing a reaction zone containing a conventional fixed-bed, supported cupric chloride-containing oxychlorination catalyst as follows:

a. According to the Invention

Ethylene, hydrogen chloride and molecular oxygen were introduced into the reaction zone. The hydrogen chloride and molecular oxygen were added to the reactant mass at at least two points along the reaction zone such that the reactant molar ratios in the reactant mass during passage through the reaction zone were maintained within the limits described by the invention. Ethylene was added only at the inlet portion of the reaction zone.

b. Not According to the Invention

Ethylene, hydrogen chloride and air as the molecular oxygen source were introduced into the reaction zone in a manner such that the hydrogen chloride:ethylene molar ratios and/or the oxygen:ethylene molar ratios exceeded 0.7 and 0.12, respectively, in at least a portion of the reaction zone, in many cases the molar ratios described by the stoichiometry of the reaction were approximated.

c. Not According to the Invention

Ethylene, hydrogen chloride and molecular oxygen were employed as the oxychlorination reactant, but introduced into the reaction zone in a manner not according to the invention. The hydrogen chloride reactant was introduced only at a single point at the inlet end of the reaction zone.

These comparative oxychlorination reactions were effected by the employment of the following equipment and procedures.

A. Equipment and Procedure

The oxychlorination reaction zone consisted of three serially arranged reaction sections or stages, each reaction section comprising a 12 feet long nickel tube, jacketed, with an internal cooling coil in the top of the jacket. The coolant used in the jacket was boiling Iso-par H (Enjay Chemical Company) under pressure. Steam condensate was circulated through the internal coil to knock-back the Iso-par H vapor. The temperature of the coolant was very nearly constant throughout the length of the jacket. Each reactor section was filled with approximately 12 feet of catalyst and inert diluent according to the catalyst loading patterns described below. The temperature and location of each reactor section's hotspot was monitored by the placement of 20 thermocouples, spaced 7 inches apart, in a thermowell running the entire length of each reactor stage. The thermocouples were connected to a temperature recording device such that the temperature profile of the entire reaction zone could be periodically obtained. Four thermocouples were inserted in the cooling jacket of each reactor section for measurement of the circulating coolant temperature. Each reactor section was provided with inlet ports at the upstream end of the section and the manifolding was such that ethylene, hydrogen chloride and air or molecular oxygen reactants could be introduced into any or all of the three reaction sections in the proportions desired. Suitable manifolding was also provided to allow recycle of the non-reaction product effluent from the third stage (ethylene-rich vapor phase) to the inlet part of the first reaction section. Provision was made for the combining of the feed streams, i.e., hydrogen chloride, air or molecular oxygen, and ethylene or ethylene-rich vapor phase effluent from the third stage (in cases where recycle was employed) prior to their introduction into the first reactor section. Sampling points on the inlet and exit lines of each reactor section permitted analysis of the compositons of such streams by a process gas chromatograph.

The third reaction section effluent was cooled in an impervious graphite water cooled exchanger and the cooled third reaction stage effluent was separated in a gas-liquid separator into a condensate phase (primarily ethylene dichloride and water) and a gas or vapor phase. The vapor phase was primarily nitrogen in cases where air was used as the oxygen reactant source and primarily ethylene in cases where molecular oxygen was utilized as the oxygen source and stoichiometric excesses of ethylene were employed. The condensate phase was removed on level control to an ethylene dichloride-water phase separator and the product ethylene dichloride and water were collected in drums which were analyzed for material balance purposes. The gas or vapor phase from the gas-liquid separator was either vented on pressure control to the atmosphere or recycled via a recycle compressor to the first reactor section. Manifolding in the recycle line permitted the venting of all the recycle gas in cases where air was used as the molecular oxygen source or a portion of the recycle gas in those oxychlorinations carried out according to the process of the invention. The degassed materials from the product ethylene dichloride and water collection vessels were combined and metered as the low pressure vent stream. Sampling points on the low pressure vent line and on the recycle (high pressure vent line) permitted analysis of the compositions of such streams by a process gas chromatograph.

The procedure utilized in carrying out the oxychlorination reactions according to (a), (b) and (c) above involved passing the reactants at super-atmospheric pressure through the reaction zone for a 4 to 12 hour period until a steady state conversion of reactants was obtained (based on constant hydrogen chloride conversion). This was followed by an 8-24 hour run at steady state wherein periodic material balances on the operation of the process were obtained. The process flow through the reaction zone was in an overall downwardly direction. The three reactor sections were oriented on a vertical plane and the process flow from the bottom of the first and second reactor sections was fed into the top of the second and third reactor sections, respectively. In all the oxychlorination reactions performed, the total ethylene requirements for the reaction (either fresh or recycled ethylene) were introduced into the first reaction zone with the hydrogen chloride and molecular oxygen or air. The flow to each of the reactor sections was adjusted to achieve the desired reactant molar ratios in the reaction mass. In the case of the oxychlorination performed according to the invention, case (a) above, the hydrogen chloride was fed to the first reactor or split between all three reactor sections or the first and second reactor sections and the molecular oxygen was split between all three sections. In the case of the oxychlorination reaction carried out using air as the oxygen source, case (b) above, the air was split between all three reactor sections and the hydrogen chloride was fed to the first or the first and second reactor sections. In the case where molecular oxygen was utilized as the oxygen source but the hydrogen chloride was introduced to the reaction zone only at the inlet end of the reaction zone, case (c) above, the molecular oxygen was split between all three reactor sections and the hydrogen chloride was introduced into the first reactor section only. In those oxychlorination reactions performed according to the process of the invention wherein the ethylene-rich vapor phase of the third reactor effluent was recycled to the first reaction section, additional fresh ethylene was introduced into the first reaction section to maintain the desired reactant molar ratios.

B. Catalyst and Catalyst Loading Patterns

The supported oxychlorination catalyst comprised a mixture of 15.5%/w cupric chloride and 1.5%/w potassium chloride deposited on F-1 alumina support (Alcoa Company) of particle size ranging from one-quarter inch diameters to 6 mesh in accordance with the general method described in U.S. Pat. No. 3,184,515 to Penner. The catalyst was prepared by soaking the F-1 alumina particles in an aqueous 2.45 M cupric ion solution of cupric chloride and potassium chloride, present at the weight ratio described, for 30 minutes, draining off the excess solution and drying the impregnated catalyst particles at 550°F for 16 hours and, finally, at 750°F for 3 hours.

In order to maintain operative reaction zone conditions of temperatures in the case of the oxychlorination reactions utilizing air as the oxygen source and reactant ratios approximately stoichiometric, thus facilitating the comparative reactions, it was necessary to dilute the supported catalyst particles with varying proportions of inert diluent in the first and second reactor sections of the reaction zone. The inert diluent employed was Modified Denstone 57, (Norton Company) in the form of $3/16 \times 1/4$ inch pellets. The fixed bed of catalyst was deployed in the reaction zone by packing the tubular reaction sections with catalyst or catalyst and inert diluent. In the case of the first and second reaction sections where varying proportions of inert diluent were employed, the catalyst particles were mixed with diluent to obtain the desired catalyst/diluent ratio prior to loading of the reactor and the fixed catalyst bed was deployed in zones or layers of varying catalyst/diluent ratios. In the comparative oxychlorination reactions described, three different catalyst loading patterns were examined. These loading patterns are shown in Table I.

TABLE I

| Catalyst Loading Pattern[a] | First Reaction Section | | | Second Reaction Section | | |
|---|---|---|---|---|---|---|
| | No. of Layers Catalyst and Diluent | Layer Length Feet | Catalyst/- Solid Diluent %v/%v In Layer | No. of Layers Catalyst and Diluent | Layer Length Feet | Catalyst/- Solid Diluent %v/%v In Layer |
| I | 3 | 6 | 25/75 | 3 | 6 | 50/50 |
| | | 3 | 50/50 | | 3 | 75/25 |
| | | 3 | 100/0 | | 3 | 100/0 |
| II | 4 | 3 | 50/50 | 3 | 6 | 50/50 |
| | | 3 | 25/75 | | 3 | 75/25 |
| | | 3 | 50/50 | | 3 | 100/0 |
| | | 3 | 100/0 | | | |
| III | 4 | 3 | 60/40 | 3 | 6 | 50/50 |
| | | 3 | 25/75 | | 3 | 75/25 |
| | | 3 | 50/50 | | 3 | 100/0 |
| | | 3 | 100/0 | | | |

[a] For all of the catalyst loading patterns employed, the third reactor section was loaded with a fixed bed containing 100% v supported catalyst particles.

C. Results

The results of the oxychlorination reactions including a detailed description of the processing parameters employed are shown in Tables II, III and IV, below, segregated according to the catalyst laoding pattern used, i.e., see Table I above. The material balance figures given, i.e., hydrogen chloride selectivity to ethylene dichloride and ethylene selectivity to ethylene dichloride, and the various reaction by-products represent the average of periodic material balances taken during the course of steady state operation of the process. To determine the material balances the quantity and composition of the total reaction zone effluent including the material vented to the atmosphere was measured with respect to time by the use of gravimetric methods in the case of the gas-liquid phase separator condensate stream and flow meters in the case of the vapor streams. These analyses were employed in combination with gas-liquid chromatographic analysis of the streams. The values given in the tables for hydrogen chloride:ethylene and oxygen:ethylene reactant molar ratios present in the reaction mass for each reactor section represent determinations of the maximum reactant molar ratios present in that reactor section. In determining these molar ratios it was assumed that the reactants charged to each reactor section were consumed substantially in proportions dictated by the stoichiometry of the reaction and that, in each reaction section, the reactant present in the lowest stoichiometric proportion with respect to the quantities of the other reactants charged was substantially consumed in that reactor section. The flow rates of reactants to the reaction zone are given in standard cubic feet per hour (SCFH) and, the numbers given for comparative reactant throughput rates are ratios based on a hydrogen chloride throughput of 80 SCFH being unity. In those oxychlorination reactions where the ethylene-rich reaction zone effluent was recycled to the first reactor section, an average analysis of the major constituents in the recycle stream during the reaction period is recorded. The location of the reactor hotspot for each reactor section in each run is measured in terms of inches from the top of the reactor section (the flow of reactants being downward). The total quantity of material vented from the reaction system in each run is derived from a composite of the high and low pressure vent streams and is recorded as an average determination of the SCFH vented during the run. For sake of convenience the reactor sections are designated as follows in the tables: first reactor section-R-1; second reactor section-R-2, third reactor section-R-3. Finally, in the tables which follow, the following component abbreviations are employed.

| Component | Abbreviation |
|---|---|
| Ethylene | $C_2$ |
| Hydrogen Chloride | HCl |
| Oxygen | $O_2$ |
| Nitrogen | $N_2$ |
| Carbon Monoxide | CO |
| Carbon Dioxide | $CO_2$ |
| Ethyl Chloride | EC |
| Ethylene Dichloride | EDC |
| Trichloroethane | TCE |
| Vinyl Chloride Monomer | VCM |

TABLE II

CATALYST LOADING PATTERN

| RUN NUMBER | 1 | 2 | 3 | 4 | 5 | 6 | 7 | 8 |
|---|---|---|---|---|---|---|---|---|
| Reaction time, hours at steady state | 20 | 16 | 21 | 24 | 24 | 24 | 12 | 20 |
| HCl:$C_2=$ Molar Ratio | | | | | | | | |
| R-1 | 0.80 | 1.73 | 0.25 | 0.30 | 0.50 | 0.52 | 0.88 | 1.68 |
| R-2 | 1.40 | 1.57 | 0.30 | 0.36 | 0.32 | 0.65 | 1.62 | 1.52 |
| R-3 | 0.22 | 0.42 | 0.05 | 0.12 | 0.11 | 0.23 | 0.72 | 0.73 |
| $O_2$:$C_2=$ Molar Ratio | | | | | | | | |
| R-1 | 0.17 | 0.19 | 0.06 | 0.06 | 0.05 | 0.09 | 0.18 | 0.17 |
| R-2 | 0.33 | 0.37 | 0.06 | 0.06 | 0.05 | 0.12 | 0.35 | 0.31 |
| R-3 | 0.63 | 0.74 | 0.03 | 0.03 | 0.02 | 0.07 | 0.64 | 0.37 |
| Comparative Reactant throughput rates | 1.7 | 1.8 | 1.0 | 1.1 | 1.0 | 2.0 | 1.0 | 1.0 |
| Flows, SCFH | | | | | | | | |
| $C_2=$ to R-1 (fresh) | 86.8 | 84.3 | 162.9 | 52.8 | 49.3 | 91.3 | 45.6 | 47.6 |
| $C_2=$ to R-1 (recycle) | 0 | 0 | 0 | 101.8 | 107.1 | 90.1 | 0 | 0 |

TABLE II—Continued

CATALYST LOADING PATTERN

| | | | | | | | | |
|---|---|---|---|---|---|---|---|---|
| HCl to R-1 | 69.7 | 146.0 | 40.0 | 45.0 | 77.4 | 93.8 | 40 | 80.0 |
| HCl to R-2 | 69.7 | 0 | 40.0 | 40.0 | 0 | 68.0 | 40 | 0 |
| HCl to R-3 | 0 | 0 | 0 | 0 | 0 | 0 | 0 | 0 |
| $O_2$ or Air* to R-1 | 70.6* | 74.2* | 9.3 | 9.1 | 8.3 | 16.2 | 38.7* | 38.7* |
| $O_2$ or Air* to R-2 | 90.2* | 92.5* | 9.1 | 8.7 | 7.5 | 17.6 | 49.1* | 46.0* |
| $O_2$ or Air* to R-3 | 58.1* | 50.7* | 3.7 | 3.6 | 3.0 | 7.4 | 26.5* | 21.0* |
| Total Recycle to R-1 | 0 | 0 | 0 | 122.2 | 123.3 | 120.4 | 0 | 0 |
| Total Feed & Recycle | 445 | 448 | 265 | 281 | 269 | 415 | 240 | 233 |
| Total Vent | 174.4 | 173.9 | 122.0 | 9.8 | 10.5 | 11.3 | 92.5 | 86.8 |
| Reaction zone Pressure, psig | | | | | | | | |
| R-1 inlet | 101 | 106 | 84 | 83 | 84 | 100 | 80 | 82 |
| R-2 inlet | 94 | 93 | 78 | 78 | 78 | 91 | 78 | 77 |
| R-3 inlet | 80 | 79 | 71 | 73 | 72 | 80 | 73 | 73 |
| Gas Separator | 60 | 60 | 66 | 68 | 66 | 67 | 70 | 69 |
| "Hot Spot" Temperature | | | | | | | | |
| R-1, °F | 573 | 593 | 459 | 467 | 466 | 508 | 590 | 527 |
| Location, inches | 63 | 98 | 91 | 112 | 112 | 112 | 49 | 66 |
| R-2, °F | 521 | 527 | 471 | 480 | 469 | 520 | 544 | 538 |
| Location, inches | 63 | 70 | 36 | 34 | 42 | 42 | 42 | 42 |
| R-3, °F | 468 | 466 | 455 | 459 | 452 | 492 | 443 | 462 |
| Location, inches | 63 | 63 | 28 | 28 | 28 | 28 | 42 | 37 |
| Recycle Analysis | | | | | | | | |
| $C_2=$ | — | — | — | 83.3 | 86.8 | 74.8 | — | — |
| CO | — | — | — | 3.7 | 2.1 | 8.2 | — | — |
| $CO_2$ | — | — | — | 5.8 | 4.9 | 9.6 | — | — |
| EC | — | — | — | 1.2 | 1.8 | 1.3 | — | — |
| EDC | — | — | — | 3.8 | 2.5 | 3.2 | — | — |
| $H_2O$ | — | — | — | 1.1 | 0.8 | 1.1 | — | — |
| Others | | | | 1.1 | 1.1 | 1.8 | | |
| HCl Conversion, % | 99.0 | 98.7 | 99.0 | 99.0 | 99.0 | 98.8 | 98.4 | 97.5 |
| HCl Selectivity to EDC | 98.6 | 97.6 | 98.4 | 98.4 | 97.0 | 98.0 | | |
| $C_2=$ Selectivity, % | | | | | | | | |
| To EDC | 96.54 | 94.96 | 96.04 | 95.92 | 93.55 | 95.30 | 96.50 | 94.25 |
| EC | 1.31 | 3.01 | 2.71 | 2.60 | 4.92 | 3.03 | 1.48 | 3.47 |
| TCE | 0.36 | 0.35 | 0.03 | 0.07 | 0.07 | 0.11 | 0.36 | 0.29 |
| VCM | 0.06 | 0.11 | 0.05 | 0.06 | 0.10 | 0.12 | 0.06 | 0.01 |
| CO | 0.24 | 0.31 | 0.43 | 0.35 | 0.23 | 0.40 | 0.21 | 0.12 |
| $CO_2$ | 1.36 | 1.09 | 0.53 | 0.67 | 0.65 | 0.72 | 1.16 | 1.59 |
| Others | 0.13 | 0.17 | 0.22 | 0.33 | 0.48 | 0.32 | 0.23 | 0.27 |

TABLE III

CATALYST LOADING PATTERN

| RUN NUMBER | 9 | 10 | 11 | 12 | 13 |
|---|---|---|---|---|---|
| Reaction time, hours at steady state | 24 | 24 | 24 | 24 | 24 |
| HCl:$C_2=$ Molar Ratio | | | | | |
| R-1 | 0.30 | 0.28 | 0.23 | 0.51 | 0.43 |
| R-2 | 0.38 | 0.38 | 0.27 | 0.33 | 0.61 |
| R-3 | 0.10 | 0.17 | 0.10 | 0.12 | 0.19 |
| $O_2$:$C_2$ Molar Ratio | | | | | |
| R-1 | 0.067 | 0.054 | 0.055 | 0.053 | 0.093 |
| R-2 | 0.072 | 0.057 | 0.057 | 0.060 | 0.107 |
| R-3 | 0.036 | 0.033 | 0.036 | 0.030 | 0.057 |
| Comparative Reactant throughput rates | 1.2 | 1.1 | 0.9 | 1.0 | 1.9 |
| Flows, SCFH | | | | | |
| $C_2=$ to R-1 (fresh) | 59.6 | 50.5 | 52.1 | 51.6 | 85.2 |
| $C_2=$ to R-1 (recycle) | 101.6 | 104.2 | 106.4 | 105.8 | 86.2 |
| HCl to R-1 | 48.4 | 43.2 | 36.7 | 80.0 | 74.3 |
| HCl to R-2 | 47.5 | 43.2 | 36.6 | 0 | 74.3 |
| HCl to R-3 | 0 | 0 | 8.1 | 0 | 0 |
| $O_2$ or Air* to R-1 | 10.8 | 8.4 | 8.7 | 8.3 | 16.0 |
| $O_2$ or Air* to R-2 | 10.1 | 7.9 | 8.1 | 8.1 | 16.0 |
| $O_2$ or Air* to R-3 | 4.4 | 4.1 | 4.5 | 3.7 | 6.7 |
| Total Recycle to R-1 | 122 | 121 | 122 | 121 | 120 |
| Total Feed & Recycle | 303 | 278 | 277 | 273 | 393 |
| Total Vent | 10.2 | 10.1 | 10.4 | 10.2 | 10.2 |
| Reaction zone Pressure, psig | | | | | |
| R-1 inlet | 84 | 83 | 83 | 86 | 99 |
| R-2 inlet | 78 | 78 | 78 | 78 | 90 |
| R-3 inlet | 70 | 71 | 71 | 71 | 77 |
| Gas Separator | 59 | 63 | 63 | 63 | 59 |
| "Hot Spot" Temperature | | | | | |
| R-1, °F | 516 | 496 | 488 | 460 | 544 |
| Location, inches | 35 | 35 | 35 | 42 | 42 |
| R-2, °F | 500 | 492 | 498 | 492 | 535 |
| Location inches | 42 | 35–42 | 35 | 35 | 42 |
| R-3, °F | 465 | 471 | 474 | 464 | 470 |
| Location, inches | 21 | 21 | 21 | 21 | 21 |
| Recycle Analysis %M | | | | | |
| $C_2=$ | 83.3 | 86.1 | 87.2 | 87.4 | 71.8 |
| CO | 3.2 | 2.3 | 2.4 | 1.6 | 5.9 |
| $CO_2$ | 6.8 | 5.5 | 5.3 | 3.4 | 11.4 |
| EC | 1.5 | 1.6 | 1.0 | 2.9 | 2.0 |
| EDC | 2.9 | 2.8 | 2.7 | 2.6 | 4.6 |

TABLE III — Continued

CATALYST LOADING PATTERN

| | | | | | |
|---|---|---|---|---|---|
| $H_2O$ | 1.5 | 1.1 | 0.7 | 1.5 | 2.4 |
| Others | 0.8 | 0.6 | 0.7 | 0.6 | 1.9 |
| HCl Conversion, % | 98.9 | 99.1 | 98.9 | 98.9 | 98.9 |
| HCl Selectivity to EDC, % | 97.8 | 97.7 | 98.2 | 95.6 | 97.8 |
| $C_2^=$ Selectivity, % | | | | | |
| To EDC | 95.29 | 94.86 | 95.95 | 91.01 | 95.11 |
| EC | 3.07 | 3.73 | 2.61 | 7.70 | 3.18 |
| TCE | 0.12 | 0.09 | 0.09 | 0.08 | 0.17 |
| VCM | 0.08 | 0.09 | 0.08 | 0.08 | 0.08 |
| CO | 0.29 | 0.22 | 0.26 | 0.17 | 0.32 |
| $CO_2$ | 0.71 | 0.63 | 0.67 | 0.43 | 0.79 |
| Others | 0.44 | 0.38 | 0.34 | 0.53 | 0.35 |

| RUN NUMBER | 14 | 15 | 16 | 17 |
|---|---|---|---|---|
| Reaction time, hours at steady state | 12 | 24 | 12 | |
| HCl:$C_2^=$ Molar Ratio | | | | |
| R-1 | 0.26 | 1.66 | 1.69 | 0.79 |
| R-2 | 0.33 | 1.53 | 1.58 | 1.49 |
| R-3 | 0.12 | 0.79 | 1.02 | 0.17 |
| $O_2$:$C_2^=$ Molar Ratio | | | | |
| R-1 | 0.054 | 0.14 | 0.13 | 0.090 |
| R-2 | 0.058 | 0.31 | 0.28 | 0.36 |
| R-3 | 0.033 | 0.37 | 0.31 | 0.46 |
| Comparative Reactant throughput rates | 1.0 | 1.0 | 1.0 | 1.0 |
| Flows, SCFH | | | | |
| $C_2^=$ to R-1 (fresh) | 49.4 | 47.6 | 47.4 | 48.6 |
| $C_2^=$ to R-1 (recycle) | 103.7 | 0 | 0 | 0 |
| HCl to R-1 | 39.2 | 78.9 | 80.0 | 38.4 |
| HCl to R-2 | 39.2 | 0 | 0 | 38.4 |
| HCl to R-3 | 0 | 0 | 0 | 0 |
| $O_2$ or Air* to R-1 | 8.2 | 30.6* | 28.9* | 20.8* |
| $O_2$ or Air* to R-2 | 7.9 | 50.7* | 47.8* | 51.0* |
| $O_2$ or Air* to R-3 | 4.0 | 23.4* | 22.4* | 24.6* |
| Total Recycle to R-1 | 121 | 0 | 0 | 0 |
| Total Feed & Recycle | 269 | 231 | 226 | 222 |
| Total Vent | 9.8 | 81.6 | 82.1 | 86.6 |
| Reaction zone Pressure, psig | | | | |
| R-1 inlet | 84 | 81 | 81 | 81 |
| R-2 inlet | 78 | 77 | 78 | 79 |
| R-3 inlet | 71 | 73 | 73 | 75 |
| Gas Separator | 63 | 68 | 68 | 70 |
| "Hot Spot" Temperature | | | | |
| R-1, °F | 491 | 562 | 564 | 580 |
| Location, inches | 35 | 35 | 35 | 28 |
| R-2, °F | 490 | 497 | 494 | 534 |
| Location inches | 42 | 35 | 35 | 56 |
| R-3, °F | 472 | 494 | 495 | 498 |
| Location, inches | 21 | 28 | 28 | 35 |
| Recycle Analysis, %M | | | | |
| $C_2^=$ | 85.7 | — | — | — |
| CO | 1.6 | — | — | — |
| $CO_2$ | 5.3 | — | — | — |
| EC | 1.6 | — | — | — |
| EDC | 3.5 | — | — | — |
| $H_2O$ | 1.8 | — | — | — |
| Others | 0.5 | — | — | — |
| HCl Conversion, % | 98.9 | 99.0 | 98.7 | 98.8 |
| HCl Selectivity to EDC, % | 97.8 | 96.2 | 96.2 | 97.0 |
| $C_2^=$ Selectivity, % | | | | |
| To EDC | 95.04 | 92.01 | 91.95 | 93.45 |
| EC | 3.60 | 5.99 | 5.83 | 3.96 |
| TCE | 0.09 | 0.27 | 0.29 | 0.38 |
| VCM | 0.07 | 0.07 | 0.20 | 0.24 |
| CO | 0.16 | 0.42 | 0.58 | 0.65 |
| $CO_2$ | 0.68 | 0.93 | 0.84 | 1.04 |
| Others | 0.36 | 0.31 | 0.31 | 0.29 |

TABLE IV

CATALYST LOADING PATTERN 1A

| RUN NUMBER | 18 | 19 | 20 | 21 | 22 | 23 | 24 |
|---|---|---|---|---|---|---|---|
| Reaction time, hours at steady state | 12 | 15 | 24 | 17 | 8 | 21 | 24 |
| HCl:$C_2^=$ Molar Ratio | | | | | | | |
| R-1 | 0.26 | 0.45 | 0.62 | 1.70 | 0.27 | 0.52 | 0.36 |
| R-2 | 0.34 | 0.65 | 0.89 | 1.50 | 0.35 | 0.34 | 0.50 |
| R-3 | 0.13 | 0.23 | 0.33 | 0.14 | 0.13 | 0.13 | 0.18 |
| $O_2$:$C_2^=$ Molar Ratio | | | | | | | |
| R-1 | 0.05 | 0.09 | 0.13 | 0.21 | 0.05 | 0.05 | 0.07 |
| R-2 | 0.06 | 0.12 | 0.17 | 0.36 | 0.06 | 0.06 | 0.09 |
| R-3 | 0.03 | 0.07 | 0.13 | 0.69 | 0.03 | 0.03 | 0.04 |
| Comparative Reactant throughput rates | 1.0 | 2.0 | 0.7 | 0.8 | 1.0 | 1.0 | 1.5 |
| Flows, SCFH | | | | | | | |
| $C_2^=$ to R-1 (fresh) | 50.7 | 92.0 | 44.8 | 38.4 | 49.9 | 52.2 | 69.2 |

TABLE IV—Continued

CATALYST LOADING PATTERN 1A

| | | | | | | | |
|---|---|---|---|---|---|---|---|
| $C_2^=$ to R-1 (recycle) | 104.6 | 86.5 | 0 | 0 | 102.8 | 102.2 | 97.5 |
| HCl to R-1 | 40.0 | 80.0 | 27.7 | 65.8 | 41.0 | 80.0 | 60.4 |
| HCl to R-2 | 40.0 | 80.0 | 25.2 | 0 | 39.2 | 0 | 58.3 |
| HCl to R-3 | 0 | 0 | 0 | 0 | 0 | 0 | 0 |
| $O_2$ or Air* to R-1 | 8.1 | 16.3 | 27.5* | 38.9* | 8.1 | 8.1 | 12.0 |
| $O_2$ or Air* to R-2 | 8.0 | 17.4 | 26.9* | 38.4* | 7.9 | 7.9 | 12.4 |
| $O_2$ or Air* to R-3 | 3.6 | 7.9 | 13.6* | 19.6* | 3.9 | 3.6 | 5.1 |
| Total Recycle to R-1 | 120 | 118 | 0 | 0 | 122 | 119 | 121 |
| Total Feed & Recycle | 270 | 412 | 166 | 201 | 272 | 271 | 338 |
| Total Vent | 10.0 | 11.0 | 80.3 | 89.6 | 9.5 | 9.9 | 10.4 |
| Reaction zone Pressure, psig | | | | | | | |
| R-1 inlet | 82 | 86 | 76 | 79 | 83 | 86 | 87 |
| R-2 inlet | 78 | 78 | 74 | 77 | 78 | 78 | 79 |
| R-3 inlet | 73 | 64 | 72 | 74 | 72 | 72 | 71 |
| Gas Separator | 66 | 48 | 66 | 66 | 66 | 66 | 61 |
| "Hot Spot" Temperature | | | | | | | |
| R-1, °F | 514 | 576 | 703 | 715 | 525 | 492 | 567 |
| Location, inches | 28 | 35 | 21 | 28 | 42 | 42 | 42 |
| R-2, °F | 474 | 498 | 521 | 538 | 474 | 473 | 494 |
| Location, inches | 42 | 42 | 28 | 42 | 42 | 42 | 42 |
| R-3, °F | 463 | 502 | 506 | 466 | 473 | 462 | 473 |
| Location, inches | 28 | 91 | 28 | 35 | 28 | 28 | 28 |
| Recycle Analysis, %m | | | | | | | |
| $C_2^=$ | 87.2 | 73.3 | — | — | 84.3 | 85.9 | 80.6 |
| CO | 1.4 | 7.5 | — | — | 2.4 | 1.1 | 3.9 |
| $CO_2$ | 4.3 | 10.9 | — | — | 5.0 | 3.9 | 6.3 |
| EC | 0.8 | 0.9 | — | — | 1.3 | 2.7 | 1.3 |
| EDC | 3.5 | 3.6 | — | — | 3.7 | 3.8 | 4.7 |
| $H_2O$ | 2.0 | 2.3 | — | — | 1.7 | 1.8 | 2.0 |
| Others | 0.8 | 1.5 | — | — | 1.6 | 0.8 | 1.2 |
| HCl Conversion, % | 99.1 | 99.1 | 99.1 | 98.6 | 98.9 | 99.0 | 99.0 |
| HCl Selectivity to EDC, % | 98.2 | 98.5 | 97.8 | 96.7 | 98.4 | 96.9 | 98.5 |
| $C_2^=$ Selectivity, % | | | | | | | |
| To EDC | 95.97 | 96.23 | 94.35 | 92.75 | 96.35 | 93.51 | 96.46 |
| To EC | 2.75 | 2.06 | 2.21 | 3.42 | 2.46 | 5.44 | 2.27 |
| TCE | 0.07 | 0.14 | 0.30 | 0.68 | 0.08 | 0.07 | 0.11 |
| VCM | 0.06 | 0.07 | 0.38 | 0.12 | 0.05 | 0.05 | 0.07 |
| CO | 0.16 | 0.41 | 0 | 0.16 | 0.24 | 0.11 | 0.30 |
| $CO_2$ | 0.58 | 0.75 | 2.37 | 2.63 | 0.60 | 0.47 | 0.60 |
| Others | 0.41 | 0.34 | 0.39 | 0.24 | 0.22 | 0.35 | 0.19 |

The results of the comparative oxychlorination reactions given in Tables II, III and IV demonstrate the several advantages of the process of the invention. The beneficial effect of the process of the invention in terms of reducing the hotspot temperature in the reaction zone for any given catalyst loading pattern over conventional processes, wherein air is used as the molecular oxygen source and the hydrogen chloride is introduced at more than one point along the reaction zone, is demonstrated by a comparison of the results obtained in Runs 1 and 6 in Table II. At approximately equivalent reactant throughput rates the hotspot temperature obtained with the process of the invention is about 65°F lower than that obtained with the conventional process. Other evidence of this beneficial effect is shown by comparing runs 11 and 17 in Table III wherein the difference in the hotspot temperatures obtained at equivalent reactant throughput rates is 82°F. As indicated in the prior art discussion, above, some benefit in reduction of hotspot temperature is claimed for conventional processes if all the requirements of hydrogen chloride for the reaction are introduced at the inlet of the reaction zone. A comparison of Runs 2 and 6 in Table II and runs 10 and 16 in Table III indicates that a substantial advantage in reduction of hotspot temperature is obtained at equivalent reactant throughput rates with the process of the invention over conventional processes. Even with the introduction of all the hydrogen chloride into the inlet end of the reaction zone, the hotspot temperatures obtained with the process of the invention are lower by 85°F and 68°F respectively, than the temperatures obtained in the conventional processes. The reduction in hotspot temperature obtained with the process of the invention is even more apparent when fixed bed catalyst systems containing higher concentrations of active catalyst particles are used. Thus, as the results given in Table IV indicate, in a reaction zone containing 60% active catalyst particles in the initial portion of the zone, the process of the invention, at high reactant throughput rates, gives hotspot temperatures well within the preferred range. For example, Run 19 shows maximum hotspot temperature of 576°F whereas attempts to operate the conventional process even at comparative low reactant throughput rates using air as the oxygen source with or without staged addition of hydrogen chloride to the reaction zone gave hotspot temperatures above the range which is considered operative, e.g., Runs 20 and 21 wherein the maximum hotspot temperature was 703° and 715°F, respectively. In the case of Run 20, wherein the hydrogen chloride was introduced at two points in the reaction zone it was necessary to increase the total ethylene charge to the reaction zone to almost double that required by the stoichiometry of the reaction to avoid a runaway reaction. This case is impractical due to the high ethylene loss to the vent. These results demonstrate the advantages of the process of the invention with respect to ease of operation and flexibility in selection of catalyst loading pattern. The process of the invention is operative with fixed beds containing high concentrations of active catalyst particles where the conventional process is inoperative due to prohibitive hotspot temperatures. It has been determined that the process of the invention will give hotspot temperatures within the operative range in fixed beds containing 100% active catalyst particles throughout the reaction zone (no inert diluent or elaborate loading pattern being required). The results also demonstrate the greater potential reactant throughput or production capacity obtainable with the process of the invention since the process of the invention is not subject to the catalyst concentration limitations in the fixed bed of conventional processes due to prohibitive hotspot temperatures.

The results given in Tables II–IV above, also demonstrate the advantage which adding the hydrogen chloride reactant to the reaction mass at more than one point along the reaction zone imparts on the process of the invention in terms of increased ethylene selectivity to the desired ethylene dichloride. Runs 4 and 5 in Table II, 11 and 12 in Table III and 22 and 23 in Table IV are comparative oxychlorinations at equivalent reactant throughput rates, in which the hydrogen chloride reactant was either added only at the inlet end of the reaction zone or as described by the invention, i.e., at more than one point along the reaction zone. All other reaction conditions were substantially similar, e.g., molecular oxygen reactant and reactant molar ratios within the limits of the invention were employed. As indicated by the ethylene selectivity to ethylene dichloride recorded in the tables, the conversion of ethylene to ethylene dichloride ranged from about 2.5 to 5 selectivity points higher in reactions carried out according to the invention with its feature of hydrogen chloride addition at more than one point along the reaction zone.

Finally, the results given in Tables II–IV demonstrate the advantage which the process of the invention with its feature of almost total recycle of the non-product reaction zone effluent to the reaction zone obtains over coventional processes using air as the oxygen source in terms of reduction of atmospheric pollutants. A comparison of the total vent rates in oxychlorination reactions conducted using air as the oxygen source e.g., Runs 1, 2, 7 and 8 in Table II, Runs 15 and 16 in Table III and Runs 20 and 21 in Table IV, with oxychlorination reactions conducted according to the process of the invention where recycle is employed, e.g., Runs 4 and 6 in Table II, Runs 9, 10, 11, 12 and 13 in Table III and Runs 18, 19, 22 and 24 in Table IV, indicates that, at approximately equivalent reactant throughput rates, the quantity in SCFH of material vented from the reaction system with the process of the invention ranges from about 6 to about 12.5% of that vented with conventional processes. Moreover, as the rate of reactant throughput increases the percentage figure given goes down because with the process of the invention, the vent rate can be maintained at a relatively constant level as reactant throughput is increased without adversely effecting ethylene selectivity to ethylene dichloride.

ILLUSTRATIVE EMBODIMENT XXIV

Using the equipment and general procedure described for Illustrative Embodiments I–XXIV above an attempted run was made to demonstrate the equivalency of air and molecular oxygen as the oxygen reactant source in the oxychlorination of ethylene by conventional techniques, i.e., stoichiometric reactant feed ratios, employing a fixed bed, supported cupric chloride catalyst. The run was carried out by introducing the total ethylene and hydrogen chloride reactant requirements at the inlet of the reaction zone (inlet of first reaction section) and introducing the molecular oxygen in three stages (at the inlets of each of the three reactor sections) while slowly increasing the total flow of molecular oxygen. The ultimate objective of the attempted runs was to attain a total molecular oxygen flow to the reaction zone such that the volume ratio of oxygen flow to total reactant flow would be equivalent to the volume ratio of air as charged to the reaction zone based on the stoichiometric requirements of oxygen. In carrying out the run the flow of molecular oxygen to the reaction zone was increased to a point at which the flow of molecular oxygen to each reactor section represented 25–30% of the flow of air required for the stoichiometry of the reaction. However, at this point the hotspot temperature in the second reactor section exceeded 720°F and the reactor had to be shut down to avoid runaway. To maintain even this degree of temperature control, at the molecular oxygen flows described, it was necessary to charge ethylene and hydrogen chloride at an hydrogen chloride:ethylene molar ratio of 1.3 or more than 150% the amount of ethylene required for the stoichiometry of the reaction. From the results of this run, it is evident that air and molecular oxygen are not equivalent as oxygen sources in ethylene oxychlorination reaction systems employing fixed bed supported cupric chloride catalysts; but rather, the use of molecular oxygen substantially increases the exothermic nature of the reaction.

1. A process for production of ethylene dichloride by contacting ethylene, hydrogen chloride and molecular oxygen in the vapor phase in a reaction zone at a temperature of from about 450°F to about 670°F in the presence of a fixed-bed, supported cupric chloride catalyst, introducing all or substantially all of the ethylene to the upstream inlet portion of the reaction zone in a sufficient stoichiometric excess and adding hydrogen chloride and molecular oxygen and the remainder of the ethylene in cases where substantially all of the ethylene is added at said upstream inlet to the reaction zone at a sufficient plurality of points throughout the reaction zone to maintain the hydrogen chloride:ethylene molar ratio below about 0.7 and the oxygen:ethylene molar ratio below about 0.12 in the reaction mass during passage through the reaction zone, and separating the resulting ethylene dichloride containing reaction zone effluent into at least one ethylene dichloride containing liquid phase and an organic vapor phase of at least 55% ethylene.

2. The process of claim 1 wherein the organic vapor phase of at least 55%v ethylene is recycled to the inlet portion of the reaction zone.

3. The process of claim 1 wherein the reaction zone is maintained at a temperature of from about 450°F to about 600°F.

4. The process of claim 1 wherein the cupric chloride content of the supported cupric chloride catalyst composition ranges from 1 to 20% by weight calculated as copper metal to the total quantity of metal plus carrier.

5. The process of claim 4 wherein the reaction zone is two or more searially arranged reactor sections of similar size wherein all or substantially all of the reactant ethylene is introduced into the reaction zone at the inlet end of the first reaction section and the reactant hydrogen chloride and molecular oxygen are added at the inlet ends of the first section and along with the remainder of the ethylene in cases where substantially all of the ethylene is added at the inlet end of the first reaction section to one or more of the remaining sections.

6. The process of claim 5 wherein three reactor sections are employed.

7. The process of claim 6 wherein the total reaction requirements of hydrogen chloride is split between the three reactor sections such that 30–60% of the total hydrogen chloride is added to each of the first and second reactor sections and 0–30% is added to the last reactor section and the total reaction requirements of molecular oxygen is split between the three reactor sections such that 30–45% of the total molecular oxygen is added to the first and second reactor sections and 10–40% is added to the last reactor section.

* * * * *

UNITED STATES PATENT OFFICE
CERTIFICATE OF CORRECTION

PATENT NO. : 3,892,816
DATED : JULY 1, 1975
INVENTOR(S) : ALBERT T. KISTER

It is certified that error appears in the above-identified patent and that said Letters Patent are hereby corrected as shown below:

The year of issue which reads "1075" should read --1975--.

The "TABLE II" heading at columns 13 and 14 which reads
        "CATALYST LOADING PATTERN"
should read
        --CATALYST LOADING PATTERN I--.

The "TABLE II - Continued" heading at columns 15 and 16 which reads
        "CATALYST LOADING PATTERN"
should read
        --CATALYST LOADING PATTERN I--.

The "TABLE III" heading at columns 15 and 16 which reads
        "CATALYST LOADING PATTERN"
should read
        --CATALYST LOADING PATTERN II--.

The "TABLE III-Continued" heading at columns 17 and 18 which reads
        "CATALYST LOADING PATTERN"
should read
        --CATALYST LOADING PATTERN II--.

UNITED STATES PATENT OFFICE
CERTIFICATE OF CORRECTION

PATENT NO. : 3,892,816
DATED : JULY 1, 1975
INVENTOR(S) : ALBERT T. KISTER

It is certified that error appears in the above–identified patent and that said Letters Patent are hereby corrected as shown below:

The "TABLE IV" heading at columns 17 and 18 which reads
"CATALYST LOADING PATTERN 1A"
should read
--CATALYST LOADING PATTERN III--.

The "TABLE IV-Continued" heading at columns 19 and 20 which reads
"CATALYST LOADING PATTERN 1A"
should read
--CATALYST LOADING PATTERN III--.

In claim 5, column 22 at line 61 the word "searially" should be changed to --serially--.

Signed and Sealed this seventh Day of October 1975

[SEAL]

Attest:

RUTH C. MASON
Attesting Officer

C. MARSHALL DANN
Commissioner of Patents and Trademarks